United States Patent [19]
Trebino et al.

[11] Patent Number: 5,648,866
[45] Date of Patent: Jul. 15, 1997

[54] OPTIMIZED ACHROMATIC PHASE-MATCHING SYSTEM AND METHOD

[75] Inventors: Rick Trebino; Ken DeLong, both of Livermore; Carl Hayden, Pleasanton, all of Calif.

[73] Assignee: Sandia Corporation, Albuquerque, N. Mex.

[21] Appl. No.: 489,473

[22] Filed: Jun. 12, 1995

[51] Int. Cl.$^6$ .................................................. G02F 1/35
[52] U.S. Cl. .................................................. 359/326
[58] Field of Search .................. 359/326–332; 385/122; 372/21–22

[56] References Cited

U.S. PATENT DOCUMENTS

| | | | |
|---|---|---|---|
| 5,017,806 | 5/1991 | Edelstein et al. | 359/330 |
| 5,119,385 | 6/1992 | Aoshima et al. | 359/330 X |
| 5,371,752 | 12/1994 | Powers et al. | 359/330 X |
| 5,377,043 | 12/1994 | Pelouch et al. | 359/326 |

OTHER PUBLICATIONS

Cheville et al., "Wide–bandwidth frequency doubling with high conversion efficiency," Optics Letters, vol. 17, No. 19, Oct. 1, 1992, pp. 1343–1345.

Martinez, "Achromatic Phase Matching for Second Harmonic Generation of Femtosecond Pulses," IEEE Journal of Quantum Electronics, vol. 25, No. 12, Dec. 1989, pp. 2464–2468.

Szabó et al., "Broadband Frequency Doubler for Femtosecond Pulses," Appl. Phys. B 50, (1990), pp. 51–54. [No Month].

Kostenbauder, "Ray–Pulse Matrices: A Rational Treatment for Dispersive Optical Systems," IEEE Journal of Quantum Electronics, vol. 26, No. 6, Jun. 1990, pp. 1148–1157.

Fork et al., "Negative disperison using pairs of prisms," Optics Letters, vol. 9, No. 5, May 1984, pp. 150–152.

Wang et al., "High–efficiency generation of ultrashort second–harmonic pulses based on the Čerenkov geometry," Optics Letters, vol. 19, No. 4, Feb. 15, 1994, pp. 254–256.

Sidick et al., "Ultrashort–pulse second–harmonic generation in quasi–phase–matched dispersive media," Optics Letters, vol. 19, No. 4, Feb. 15, 1994, pp. 266–268.

Martinez et al., "Negative group–velocity dispersion using refraction," J. Opt. Soc. Am.A, vol. 1, No. 10, Oct. 1984, pp. 1003–1006.

Short et al., "Frequency Conversion of Broad–Bandwidth Laser Light," IEEE Journal of Quantum Electronics, vol. 26, No. 3, Mar. 1990, pp. 580–588.

Trebino, "Achromatic N–prism beam expanders: optimal configurations," Applied Optics, vol. 24, No. 8, Apr. 1985, pp. 1130–1138.

Trebino et al., "Achromatic N–prism beam expanders: optimal configurations II," SPIE vol. 540, Southwest Conference on Optics (1985) pp. 104–109. [No Month].

*Primary Examiner*—John D. Lee
*Attorney, Agent, or Firm*—Timothy D. Stanley; Kurt C. Olsen; Donald A. Nissen

[57] ABSTRACT

An optical system for efficiently directing a large bandwidth light (e.g., a femtosecond laser pulse) onto a nonlinear optical medium includes a plurality of optical elements for directing an input light pulse onto a nonlinear optical medium arranged such that the angle $\theta_{in}$ which the light pulse directed onto the nonlinear optical medium is substantially independent of a position x of the light beam entering the optical system. The optical system is also constructed such that the group velocity dispersion of light pulses passing through the system can be tuned to a desired value including negative group velocity dispersion.

20 Claims, 6 Drawing Sheets

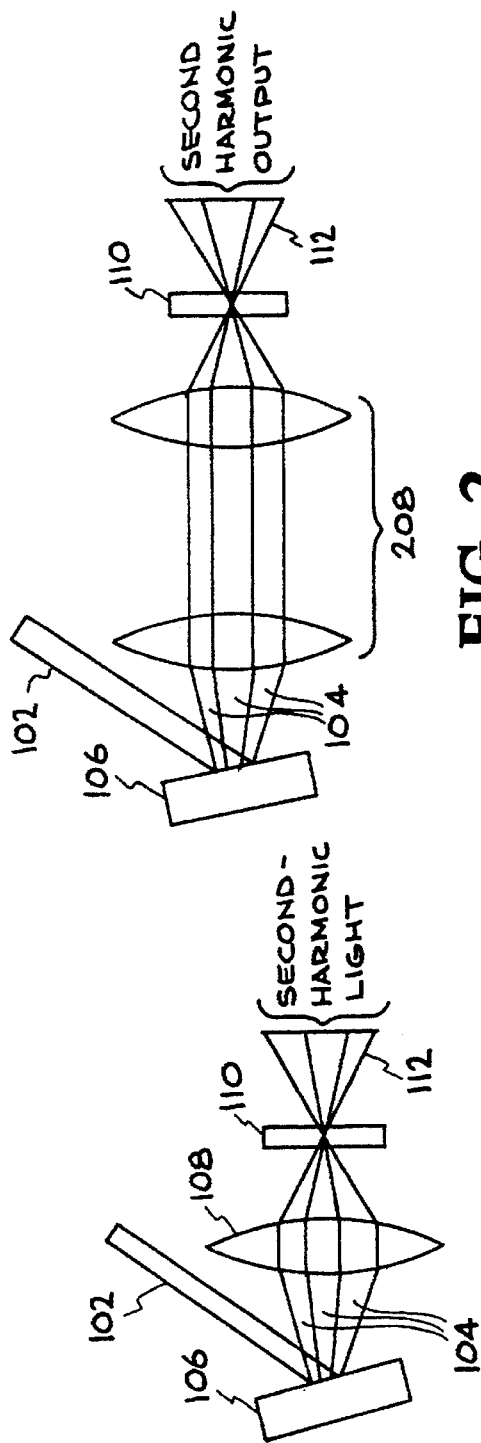
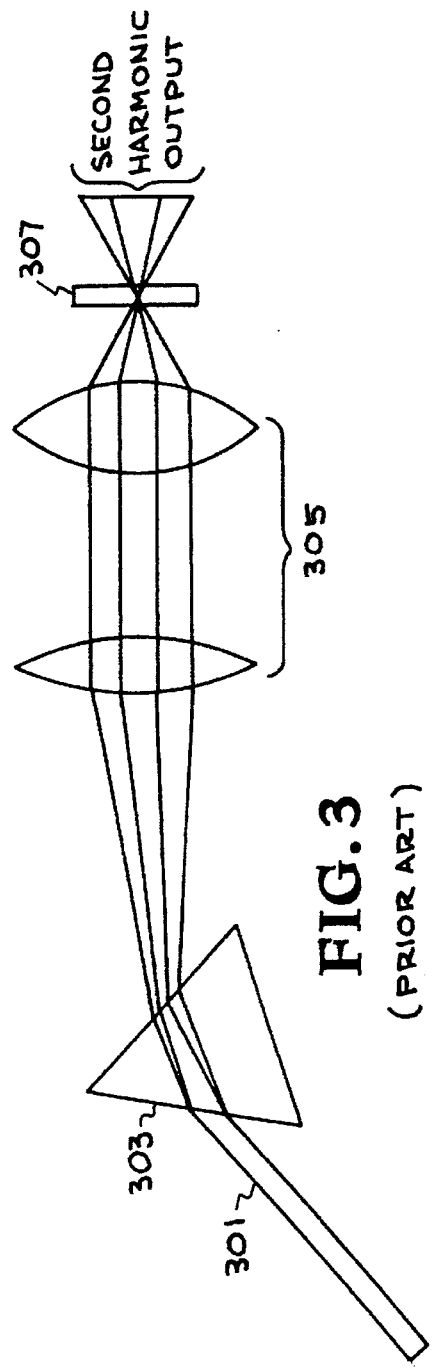
FIG. 1 (PRIOR ART)
FIG. 2 (PRIOR ART)
FIG. 3 (PRIOR ART)

| APPARATUS | dθ/dx | dt/dω | CAN dt/dω BE MADE 0 ? |
|---|---|---|---|
| FIG. 1 (PRIOR ART) | -m/f | G | NO |
| FIG. 2 (PRIOR ART) | 0 | G | NO |
| FIG. 3 (PRIOR ART) | 0 | G | NO |
| FIG. 4 (PRIOR ART) | -1/f | G-CONSTANT × L | YES |
| FIG. 8 | 0 | G-CONSTANT × L | YES |
| FIG. 11 | 0 | G-CONSTANT × L | YES |
| FIG. 11 (W/TELESCOPE) | 0 | G-CONSTANT × L | YES |

OPTIMIZED ACHROMATIC PHASE-MATCHING SYSTEM AND METHOD

STATEMENT OF GOVERNMENT RIGHTS

This invention was made with Government support under Contract no. DE-AC04-94AL8500 awarded by the U.S. Department of Energy to Sandia Corporation. The Government has certain rights in the invention.

BACKGROUND OF THE INVENTION

This invention relates in general to a system and method for achieving efficient frequency-doubling of broadband laser light using achromatic phase-matching, and in particular to an efficient achromatic phase-matching optical system and method which has a tunable group velocity dispersion.

Second-harmonic generation (SHG), the generation of light of twice the frequency of available laser light, has been an essential tool of laser research for many years. It is used widely to generate ultraviolet light because such wavelengths are difficult to generate directly from a laser. Indeed, it is used often to generate visible light from a near-infrared laser because it is easier to generate near-infrared laser light than visible light. In general, it is possible to "frequency-double" light from essentially all visible and near-infrared lasers.

A particular type of laser light that is important to frequency-double is ultrashort laser pulses, which offer high temporal resolution and have broad bandwidths and hence have many important applications. Such applications include ultrafast spectroscopy, coherent control of chemical reactions, laser fusion using short ultraviolet pulses as a driver pulse, laser radar (LIDAR), requiring many wavelengths in all spectral ranges, including the ultraviolet, etc. Conventional frequency-doubling using a SHG process has not been particularly efficient or effective for such short pulses.

The use of SHG processes to frequency-double broadband light that is incoherent has also proved to be difficult and inefficient. In general, ultrashort pulses can be considered broadband light whose frequencies are in phase. In contrast, incoherent light can be considered broadband light whose frequencies are randomly phased. These two types of light are difficult to frequency-double due to their respective large bandwidths. As a result of the large bandwidths, efficient methods for frequency-doubling both of these types of light have not been developed. The drawbacks of conventional attempts to handle such broad bandwidths will be understood from the following description of the SHG process and the various methods conventionally used.

The efficiency of a SHG process, $\eta$, depends on several factors. A first factor is the nonlinear coefficient of a SHG crystal used. This factor depends on internal properties of the crystal and can only be improved by manipulating the composition of the crystal.

Second, $\eta$ is proportional to the square of the length of the crystal, L. Thus, thick crystals yield much higher efficiency than thin ones.

Third, $\eta$ depends on the laser intensity and is, typically, directly proportional to the laser intensity. Consequently, continuous-beam lasers, which have relatively low intensity, frequency-double inefficiently while pulsed lasers, which generally achieve higher intensity, frequency-double more efficiently. In general, the shorter the pulse the more efficiently it frequency-doubles. Picosecond ($10^{-12}$ to $10^{-9}$ seconds) pulses are known to frequency-double quite efficiently. Values of $\eta$ in excess of 50% have been reported.

A problem develops, however, when the duration of the pulse is reduced to the femtosecond ($10^{-15}$ to $10^{-12}$ seconds) regime. Despite the very high intensity achievable with such very short pulses, very low values of $\eta$ have conventionally been achieved for such pulses. With femtosecond pulses, it is common to operate at values of $\eta$ of $\approx 1\%$ when generating ultraviolet light.

The low efficiency associated with femtosecond pulses is a result of deviations in phase-matching of the pulse incident on the SHG crystal. In order for frequency-doubling to take place in the crystal, the refractive index of the input laser light (at the "fundamental" wavelength) must equal the refractive index of the frequency-doubled light to be produced. The refractive index of a crystal varies both with the incidence angle and frequency of the input beam. Different incidence angles must be used to obtain maximum efficiency $\eta$ for different wavelengths. This requirement will be referred to herein as the "phase-matching condition," or "phase-matching" for short. The efficiency $\eta$ is strongly peaked with respect to angle for a given wavelength and also with respect to wavelength for a given angle. Thus, only a small range of wavelengths near the exact phase-matching wavelength can still yield high efficiency $\eta$ for a given angle. The range of wavelengths that achieves high-efficiency frequency-doubling for a single angle is called the crystal's "phase-matching bandwidth" for that angle. If the input laser light contains frequencies outside this bandwidth, such frequencies will not produce their corresponding second harmonic (i.e., will not be frequency-doubled). Thus, the efficiency of the overall process is reduced.

When the crystal bandwidth is greater than the input light bandwidth, the above effect can be neglected. However, when the crystal bandwidth is less than the bandwidth of the input light, the SHG efficiency is proportional to the crystal bandwidth, yielding a fourth factor. In this case, the efficiency can be written approximately as:

$$\eta << d^2 I L^2 (\Delta\lambda_{cr}/\Delta\lambda_l)$$

where d is the nonlinear coefficient of the crystal, I is the light intensity, L is the crystal length, $\Delta\lambda_{cr}$ is the bandwidth of the crystal, and $\Delta\lambda_l$ is the bandwidth of the light.

Known SHG crystals generally have sufficient bandwidth to frequency-double pulses of a few picoseconds or more (which are usually relatively narrowband), but they lack sufficient bandwidth to efficiently frequency-double femtosecond pulses, which are necessarily very broadband, often having bandwidths of many nanometers.

The bandwidth $\Delta\lambda_{cr}$ of an SHG crystal is given by:

$$\Delta\lambda_{cr} = (\lambda/4L)/[(dn/d\lambda)_f - (dn/d\lambda)_s]$$

where $\lambda$ is the wavelength of light and $dn/d\lambda$ is the derivative of the refractive index n with respect to wavelength at the appropriate polarization at the fundamental wavelength or second harmonic wavelength, as indicated by the subscripts, f and s, respectively.

Thus, the bandwidth of an SHG crystal is a function of the crystal's refractive-index vs. wavelength curve, a fundamental property of the crystal. Furthermore, another important characteristic of the phase-matching bandwidth, as seen in the above equation, is that it is inversely proportional to the length, L, of the crystal.

As can be appreciated from the above discussion, if a thick crystal is used in order to take advantage of the $L^2$ dependence, the phase-matching bandwidth will be small due to the 1/L factor in it. In this case, the range of frequencies that fall within the crystal bandwidth will produce second harmonic frequencies efficiently, but the remainder of the pulse frequencies, representing a significant fraction of the pulse's energy, will not produce second harmonic frequencies at all. This yields an overall low value of $\eta$. On the other hand, if the crystal is kept thin in order to achieve a large phase-matching bandwidth, then all pulse frequency components will be phase-matched and produce second harmonics, but the $L^2$ dependence in the efficiency will cause lower values of $\eta$.

Conventionally, thin-crystals generally produce even lower efficiency than thick-crystals due to the stronger dependence of $\eta$ on the L ($L^2$) than phase-matching bandwidth ($1/L$). However, thin-crystals are often preferred because a second-harmonic pulse with a small range of frequencies (that is, a small bandwidth) is a lengthened pulse, which is generally even more undesirable than an inefficient process. For a 600-nm pulse that is 100 fs in length, the required thickness of KDP ($KH_2PO_4$, a commonly used SHG crystal) that does not yield pulse lengthening is about 250 µm. The analogous thickness of BBO (betabarium borate) is approximately 80 µm.

One attempt to solve the above problems is to produce ultra-thin SHG crystals with very high nonlinear coefficients. Typically, organic media are used. However, useful crystals that can compete with standard crystals, such as BBO and KDP have not been achieved.

Various other attempts have been employed such as selecting the refractive-index parameters of KDP to yield a large bandwidth for wavelengths of particular interest, increasing the bandwidth by using two crystals in quadrature, etc. None of these attempts have achieved a satisfactory SHG process.

Another attempt to improve the efficiency of the SHG process is to carry out achromatic phase-matching of the laser pulse incident upon the SHG crystal. FIGS. 1 and 2 show two such conventional approaches. As illustrated, the input light beam 102 is dispersed into its individual frequency components 104 using a diffraction grating 106. As a result, the frequency components 104 of the input light will each propagate at a different angle, with adjacent frequencies having adjacent angles of propagation. Then, using a single lens 108 (FIG. 1) or a two-lens telescope 208 (FIG. 2), these light rays are recombined at the SHG crystal 110. In this manner, all frequencies overlap at the same point and each frequency enters the crystal 110 at its optimal phase-matching angle. Thus, each frequency component of the laser pulse efficiently frequency doubles. In other words, each frequency component essentially acts as an independent and narrowband process, each of which can be quite efficient when a relatively thick crystal is used. Since each frequency component can be treated as a narrowband beam that does not require an SHG crystal with a large bandwidth, a relatively thick crystal can be used.

It is important to note that, because the second harmonic beam produced will be dispersed at an angle, an analogous optical apparatus must be used on the output side of the crystal to reconstruct the second-harmonic beam.

While these designs potentially achieve improved efficiency in the SHG process itself, they introduce a new inefficiency associated with the diffraction grating. Diffraction gratings are not particularly efficient, and since an additional diffraction grating is required to reconstruct the second harmonic on the other side of the SHG crystal, efficiency is reduced even more. This is especially true if the diffraction grating must operate on ultraviolet light, which will be the most common case in SHG processes. When the inefficiencies of the diffraction gratings 106 are considered, the overall efficiency of the SHG process is reduced by roughly a factor of 4. While the overall efficiency of these designs is still greater than that typically obtainable without achromatic phase-matching using standard crystals, the efficiency is not sufficiently improved that achromatic phase-matching has found practical use.

An alternative approach uses prisms instead of diffraction gratings to disperse the input beam. Both disperse light into its frequency components, but prisms can be anti-reflection-coated or used at Brewster's angle and hence, can result in no loss of efficiency. However, prisms typically have about one tenth the dispersion available from a grating, which is required for a typical achromatic phase-matching situation.

As illustrated in FIGS. 3 and 4, in such designs the prisms have been used in conjunction with lens devices to amplify the prism dispersion to appropriate values. In FIG. 3, the input light 301 is incident on a single prism 303 and a two-lens telescope 305 is used to amplify the dispersion of the prism 303 and to focus the light onto the SHG crystal 307. In FIG. 4, the light pulse 401 is passed through two oppositely oriented prisms 403, 404 and then directed through a single lens 407 to recombine the various frequencies in the SHG crystal 409.

The device depicted in FIG. 3 achieves sufficient dispersion because the two-lens telescope 305 amplifies the dispersion of the prism by $1/M$, where M is the magnification of the telescope. A problem associated with such a design is that the group velocity dispersion (the tendency for red wavelengths to travel faster than blue wavelengths) in the system is always positive. Thus, the pulse spreads in time greatly reducing the efficiency of the overall systems for most types of ultrashort light pulses as more fully described below.

The device of FIG. 4 achieves sufficient dispersion because a sufficiently short-focal-length lens 407 can be used to recombine the spatially dispersed rays out of the two-prism assembly to achieve the desired dispersion. While this design can achieve zero (or negative) group-velocity dispersion, it suffers from a different flaw. The angle at which the light rays are incident at the crystal is dependent upon the input position of the input light beam 401. This also tends to reduce the efficiency of the SHG process as more fully developed below.

SUMMARY OF THE INVENTION

It is therefore an object of the instant invention to provide an optical system for performing achromatic phase-matching which overcomes the drawbacks of the conventional approaches.

It is another object to provide an achromatic phase-matching device for use in a SHG process such that the group-velocity dispersion is tunable, all the light rays of a given frequency enter the SHG crystal at the appropriate phase-matching angle, and no inefficient elements, such as gratings, are used, in order to achieve optimally efficient operation by satisfying the constraints imposed by the SHG process.

To achieve these and other objects there is provided an apparatus for directing a large bandwidth light pulse onto a nonlinear optical medium which includes an input optical element configured to receive the light pulse at a position x thereon, and an output optical element configured to output the light pulse onto the nonlinear optical medium at an angle $\theta$ relative to the nonlinear optical medium which is substantially independent of the position x. The apparatus is configured such that the intensity of the light pulse incident upon the nonlinear medium is maximized by adjusting a group velocity dispersion of the light pulse as it passes through the various optical elements.

There is also provided a method of directing a large bandwidth light pulse onto a nonlinear optical medium, by directing the light pulse to a series of optical elements such that the light pulse is incident on a input optical element at a position x on the input optical element, passing the light pulse thorough the series of optical elements, directing the light pulse from the series of optical elements onto the nonlinear optical medium at an angle θ with respect to the nonlinear optical medium such that the angle θ is substantially independent of the position x, and adjusting group velocity dispersion of the light pulse as it travels through the series of optical elements such that the group-velocity dispersion of the light pulse is at a desired value when it reaches the nonlinear optical medium.

The system and method can be used to efficiently produce second harmonic frequencies. Moreover, the output can be combined with a sum generation crystal to produce third harmonic frequencies.

BRIEF DESCRIPTION OF THE DRAWINGS

The instant invention will be better understood by reference to the detailed description of the preferred embodiments of the invention with reference to the following drawings in which:

FIG. 1 illustrates a conventional achromatic phase-matching system;

FIG. 2 illustrates another conventional achromatic phase-matching system;

FIG. 3 illustrates a conventional achromatic phase-matching system using a single prism;

DETAILED DESCRIPTION OF THE PREFERRED EMBODIMENTS

Figure 5:
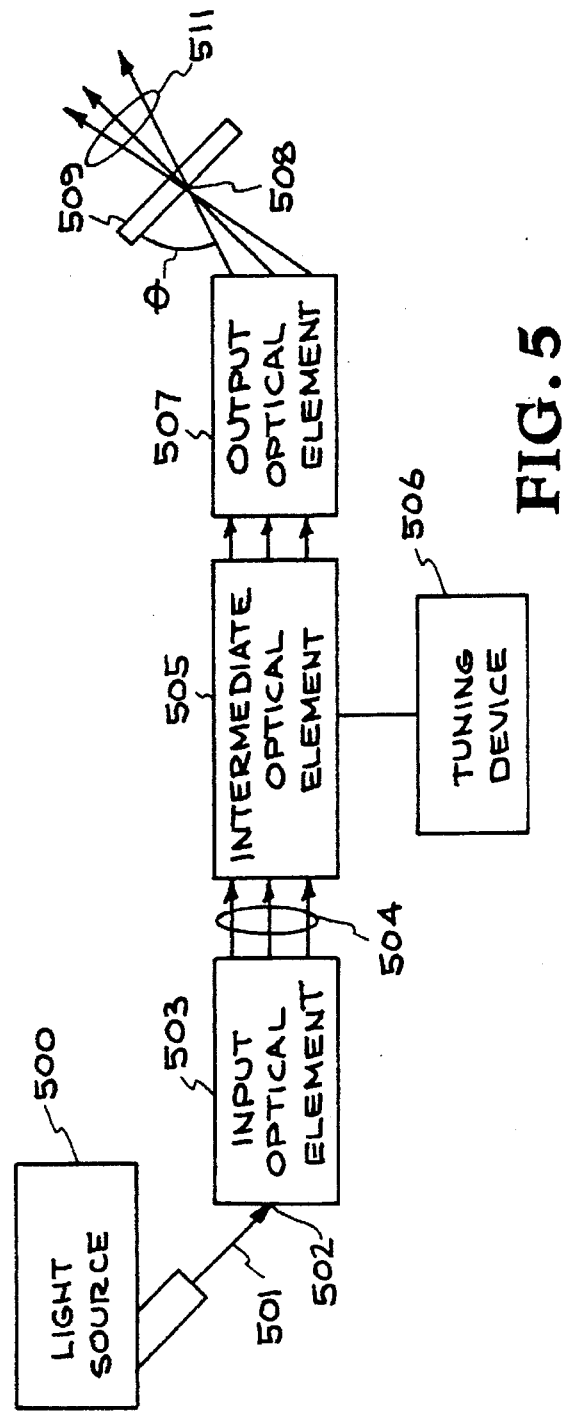
FIG. 5 illustrates an embodiment of the instant invention.

An apparatus and method according to the instant invention is illustrated schematically in FIG. 5. It is noted that throughout this application the term "optical" is used in its broadest sense as pertaining to light. Moreover, the term light is used in its broadest sense to include all forms of electromagnetic radiation and is not limited to visible light.

In FIG. 5, a light source 500 produces an ultrashort (or otherwise broadband) light pulse 501. The light pulse 501 is directed onto an input optical element 503 at a position x designated by reference numeral 502 on the optical element 503. The input optical element 503 disperses the input light pulse 501 into individual frequency components as light beam 504. The light beam is passed through one or more intermediate optical elements 505 which, in the illustrated embodiment, are connected to a tuning device 506 to enable tuning of the group velocity dispersion of the light beam 505. As more fully described below, the tuning device may include a mechanism for translating the optical element along a particular axis with respect to the optimal element and the light beam. It is noted, as more fully described below, the tuning of the group velocity dispersion can be carried out using any of the optical elements in the system depending upon the actual design.

The light beam is focused by an output optical element 507 onto a non-linearly responding medium 509 at a position 508 defining an angle θ with respect to the medium 509. If the nonlinear responding medium is a SHG crystal, the light beam incident upon the crystal is passed though the crystal and is frequency-doubled. It should be noted, however, that the instant claimed invention is not limited to frequency doubling. Various nonlinear responding mediums can be used to achieve other desired effects.

The optical efficiency of the instant invention depends upon the optical elements used and the ability to tune the group velocity dispersion. The selection criteria of optical elements used in the system and the mechanism used to tune the system in order to achieve an efficient SHG process will be more readily understood by examining the manner in which the light propagates through the system and into the crystal. This also illustrates the fundamental shortcomings of the above described conventional designs.

Optimal efficiency of a SHG process will occur if all frequency components in the beam illuminate the crystal at the same time, thus achieving maximum intensity at the crystal. Because essentially all optical elements, such as lenses, prisms, and windows, have a faster speed of light (i.e., group velocity) for lower frequencies than for higher frequencies, the lower frequencies of the pulse emerge from the optical element leading the higher frequencies. This process is known as "group-velocity dispersion." Group-velocity dispersion causes pulses to be lengthened after propagating through optical elements. Conventionally, light pulses from ultrafast lasers emerge from the laser fairly short, but by the time they arrive at their destination, having passed through significant amounts of optical elements, lower frequencies can precede their higher frequencies by a significant amount. Such pulses are said to be "positively chirped." Pulses entering an achromatic-phase-matching device will typically be somewhat lengthened (i.e., positively chirped) as a result of propagating through optical material. Even if the pulse is directly emanated from the laser to the achromatic phase-matching device, the device itself may introduce a positive chirp to the beam. Thus, one requirement of an efficient achromatic phasematching device is the ability to achieve zero or negative group velocity dispersion. Moreover, if the device is to be used with a number of different light sources, the group velocity dispersion must be tunable to an appropriate value.

Another requirement of the phase-matching device in order to obtain maximal efficiency is that all light rays of a given frequency illuminate the crystal at the phase-matching angle for that frequency. In other words, a spread in such angles for a given frequency is undesirable. Thus, an optimally efficient device must be able to eliminate or minimize any such spread.

An analysis of achromatic phase-matching devices can be made using the mathematic relationship of Kostenbauder matrices. Kostenbauder matrices are similar to what are often called ABCD matrices. ABCD matrices model the effect of an optical system on the beam position and angle of light rays entering into it. For each optical apparatus, there is a unique ABCD matrix that describes it. For a given vector of position, $x_{in}$ and angle, $\theta_{in}$, of a light ray entering the optical device, the ABCD matrix gives the vector of position, $x_{out}$ and angle, $\theta_{out}$, of the output ray. In fact, the output position-and-angle vector is simply the product of the apparatus ABCD matrix and the input position-and-angle vector:

$$\begin{bmatrix} x_{out} \\ \theta_{out} \end{bmatrix} = \begin{bmatrix} A & B \\ C & D \end{bmatrix} \begin{bmatrix} x_{in} \\ \theta_{in} \end{bmatrix}$$

The ABCD matrix is composed of derivatives, $A=dx_{out}/dx_{in}$ $B=dx_{out}/d\theta_{in}$, etc. Hereinafter, the subscripts on these quantities will not be used when they are used in derivatives. It should be understood that any quantity in the numerator is an output quantity, and any quantity in the denominator is an input quantity. An additional point regarding ABCD matrices is that they can be used to model the beam size and radius of curvature.

As described above, Kostenbauder matrices are a generalization of ABCD matrices, and they are used for modelling the input and output beam positions (x), angles ($\theta$), times (t), and frequencies (v) of a light ray passing through an optical apparatus:

$$\begin{bmatrix} x_{out} \\ \theta_{out} \\ t_{out} \\ v_{out} \end{bmatrix} = \begin{bmatrix} A & B & 0 & E \\ C & D & 0 & F \\ G & H & 1 & I \\ 0 & 0 & 0 & 1 \end{bmatrix} \begin{bmatrix} x_{in} \\ \theta_{in} \\ t_{in} \\ v_{in} \end{bmatrix}$$

where the zeros (0) and ones (1) indicate known relationships universally obeyed by all paraxial systems. Alternatively, Kostenbauder matrices can be considered to model the beam's size, radius of curvature, its pulse length, and chirp parameter. Like ABCD matrices, Kostenbauder matrices are composed of derivatives, dv/du, where u and v are each one of the above parameters:

$$\begin{bmatrix} x_{out} \\ \theta_{out} \\ t_{out} \\ v_{out} \end{bmatrix} = \begin{bmatrix} \frac{dx_{out}}{dx_{in}} & \frac{dx_{out}}{d\theta_{in}} & 0 & \frac{dx_{out}}{dv_{in}} \\ \frac{d\theta_{out}}{dx_{in}} & \frac{d\theta_{out}}{d\theta_{in}} & 0 & \frac{d\theta_{out}}{dv_{in}} \\ \frac{dt_{out}}{dx_{in}} & \frac{dt_{out}}{d\theta_{in}} & 1 & \frac{dt_{out}}{dt_{in}} \\ 0 & 0 & 0 & 1 \end{bmatrix} \begin{bmatrix} x_{in} \\ \theta_{in} \\ t_{in} \\ v_{in} \end{bmatrix}$$

There are thus 16 elements (9 of which can vary) in the Kostenbauder matrix. Each element describes the effect of the apparatus on a variance of the input quantity u as it causes the output quantity v to vary. Thus, if an important design criterion is that the output position not depend on the input ray angle, the Kostenbauder matrix element, $dx/d\theta$, must be equal to zero. (This is the case when a focus is required, for example.)

In achromatic phase-matching, specifically, an important criterion is to achieve the correct dispersion, $d\theta/dv$, at the SHG crystal. This criterion can be met by each of the above described conventional approaches if appropriate optics and orientations are used.

Another important criterion for achromatic phase-matching systems is that the arrival time of each frequency be the same at the SHG crystal. If the input pulse is not chirped (i.e., it has all frequency components overlapped in time), this condition requires that dt/dv be zero. If, as is usually the case, the input pulse is positively chirped, then dt/dv of the system must be negative to compensate. To obtain maximum versatility for the process, the group velocity dispersion dt/dv of the optical system must be variable (tunable) in order to achieve the shortest possible pulse in the SHG crystal. This is required to achieve the maximal intensity, which yields the highest efficiency for the system.

Figure 4:
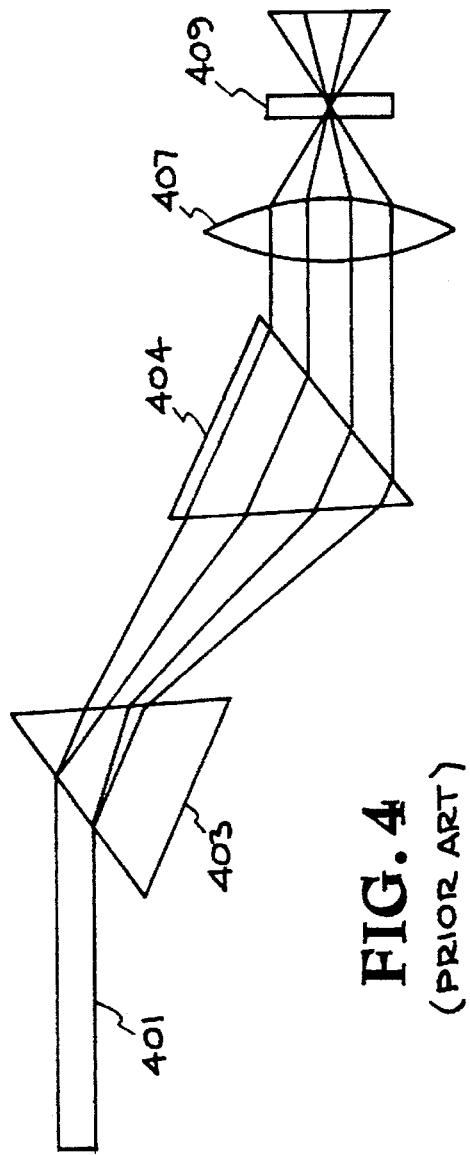
FIG. 4 illustrates a conventional achromatic phase-matching system using two prisms and a single lens.
Figures 6, 7A, 7B, 7C:
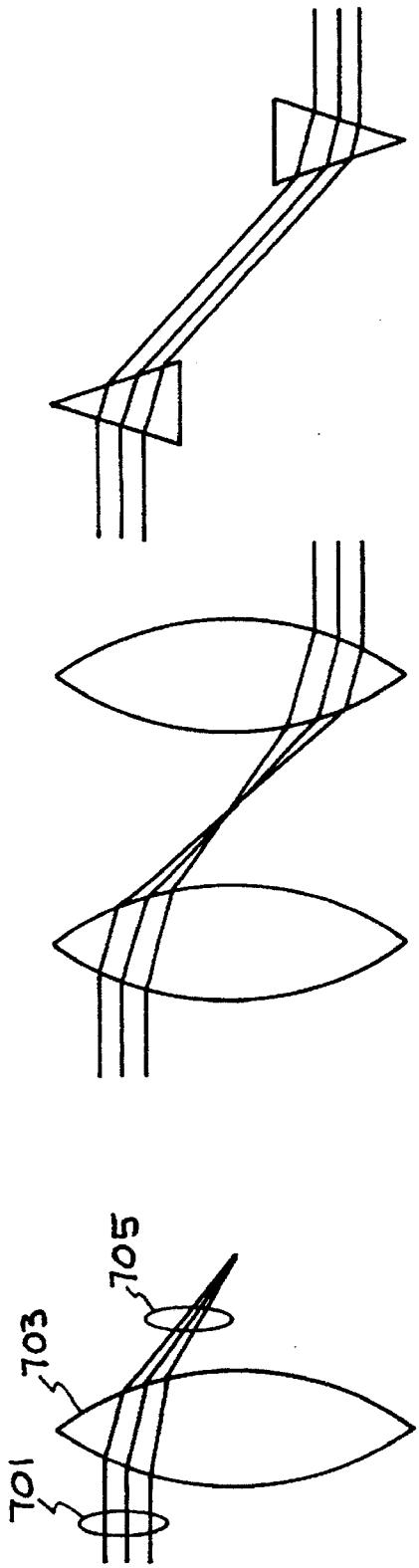
FIG. 6 depicts a comparison between the achromatic phase-matching systems of conventional design and those of the instant invention.
FIGS. 7A through 7C illustrates the interaction of light beams with various optical elements.

Negative values of dt/dv are not attained in most optical systems. The prior art systems depicted in FIGS. 1–3, for example, cannot achieve negative group velocity dispersion. (While the two-prism-one-lens design depicted in FIG. 4 is capable of achieving this criterion, it is unable to achieve the other important criterion described below.) The table depicted in FIG. 6 gives the mathematical expressions for the quantity, dt/d$\omega$, where $\omega=2\pi v$ for the conventional designs depicted in FIGS. 1–4 as compared to specific embodiments of the instant invention described below. In the table the value G represents the group velocity dispersions for the optical elements in the system. The value L represents the separation between the first two prisms in the designs using more than one prism. The constants in each case are different, but they are all positive and similar in magnitude. It can be seen that dt/dv is necessarily positive for each of the designs depicted in FIGS. 1–3. As a result, positively chirped pulses cannot be efficiently doubled with these designs. Moreover, unchirped input pulses will not efficiently double since the devices themselves have positive temporal dispersion dt/dv, leading to a positively chirped pulse at the SHG crystal. Thus, for these designs to work properly, the input pulse must be sufficiently negatively chirped to overcome the positive dt/dv of the device. In this manner, this effect can be somewhat minimized. However, this type of device will typically be used to produce UV light, and the above effect will be even more important on the output side of the device where, due to the wavelengths involved, dispersion will be much higher. As a result, additional temporal pulse compression will be required after the device, requiring an increase in optical components and space requirements.

Another important criterion that an optimally efficient achromatic phase-matching system must meet is that the angle $\theta$ of a light ray at the SHG crystal depend only on frequency and be independent of the position x of the input ray. Because beams have a finite size, if such a dependency exists, a finite range of angles will occur at the crystal for each frequency. As a result, the light of a given frequency only enters the crystal at the correct phase-matching angle if it is also at the correct position in the beam. As this condition can only be met by light at one point, a considerable amount of light of a given frequency will enter the crystal at the wrong angle. The criterion that the ray angle at the crystal not depend on input beam position can be precisely stated by saying that $d\theta/dx=0$.

It can be understood that any design that involves only one lens (e.g., designs of FIG. 1 and FIG. 4) can not meet this criterion. As illustrated in FIG. 7A parallel rays 701 of a given frequency enter a lens 703. After the lens 703 the rays 705 converge. Thus, different angles exist for different rays of the same frequency. Accordingly, a one lens system is incapable of meeting the $d\theta/dx=0$ criterion of efficient achromatic phase-matching, since some of these rays will be outside the range of angles that yield phase-matching.

Conversely, the two-lens system of FIG. 2 and the one-prism-two-lens design in FIG. 3 achieve this criterion. As illustrated in FIG. 7B, parallel rays entering a two-lens telescope are recollimated by the second lens provided that the lens separation and tilt angles are correct.

As illustrated in FIG. 7C, prisms automatically satisfy the condition, dθ/dx=0. For prisms, the output angle depends only on the input angle and the frequency. So for a collimated beam of a given frequency, the output angle of each ray is the same.

The table in FIG. 6 provides expressions for the quantity, dθ/dx, for the conventional designs as well as specific embodiments of the instant invention described more fully below. As the table illustrates, none of the prior art designs (FIGS. 1–4) are able to meet both of the desired constraints. Indeed, some designs fail to achieve either. While one design can achieve negative group velocity dispersion (i.e., dt/dv) it cannot achieve dθ/dx=0.

In contrast to previously known achromatic phase matching designs, the device of the instant invention is capable of satisfying each of the above described constraints.

Figure 8:
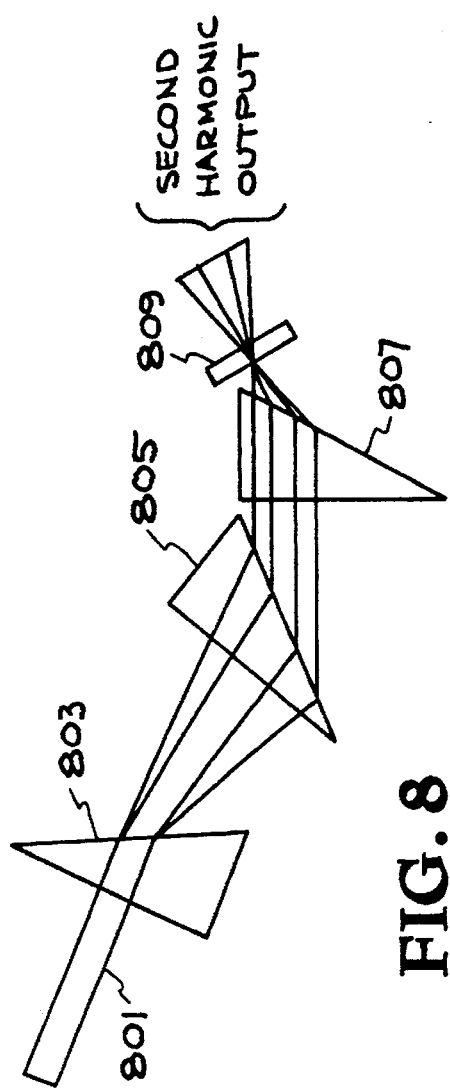
FIG. 8 illustrates another embodiment of the achromatic phase-matching system in accordance with the instant invention.

FIG. 8 illustrates an embodiment of the instant invention that satisfies all of the above criteria. Moreover, this design is easy to construct and align as will be appreciated from the discussion below. This embodiment according to the invention employs an all-prism spatial beam compressor to magnify prismatic dispersion to a sufficient level for achromatic phase-matching. In this embodiment, three Littrow prisms 803, 805 and 807 are employed. The input beam 801 is passed through the first prism 803 and dispersed. The second and third prisms 805, 807 together with the first prism 803 act as a spatial beam compressor which focuses the light beam onto the SHG crystal 809.

In the device of FIG. 8, the beam compressor is constructed to have a compression factor, 1/M, where 1/M<1. As in the lens telescope, if the compressor reduces the spatial extent of the beam by a factor of M, then the beam's angular dispersion will be increased by a factor of M. Since a dispersing prism is used in order to disperse the beam at an angle, the action of the beam compressor magnifies the frequency dispersion by a factor of M. If M is selected to be approximately 10, then the desired amplification of the angular dispersion for achromatic phase matching is achieved. It is important to note that the beam compression of the prism beam compressor occurs in only one dimension, and not two, as in the lens telescope. Thus, the prism design is more akin to a cylindrical lens telescope, but it is vastly easier to align, and can also be used to add additional dispersion to the device. A similar arrangement is used on the other side of the crystal in order to reconstruct the second harmonic beam. In this case, however, a prism beam expander is employed.

The achromatic phase-matching device of FIG. 8 overcomes the drawbacks associated with the prior art devices. First, an increase in intensity at the SHG crystal increases the efficiency of the SHG process and is usually desired. The decrease in beam size is achieved with the prismatic spatial beam compressor. A decrease by a factor of ≈10 is typically the amount desired.

Another advantage of the device depicted in FIG. 8 is that it can be constructed using only prisms. Thus, the device necessarily achieves the constraint that dθ/dx=0. This condition is automatically achieved independent of all alignment parameters. Thus, the system is easier to set up and less susceptible to errors due to misalignment.

Another significant advantage of the device of FIG. 8 is that the prism spatial beam compressor, can also act like a temporal pulse compressor. In other words, the device can achieve negative group velocity dispersion dt/dv. As described above, this feature is very important since any short pulse that is to be frequency-doubled must be temporally compressed before frequency-doubling in order to achieve optimal efficiency. Also temporal compression is important for later use of the frequency-doubled light. Typically, a pulse to be frequency-doubled has just exited from an amplifier, and has been spread in time by group-velocity dispersion and needs to be pulse compressed.

Figure 9:
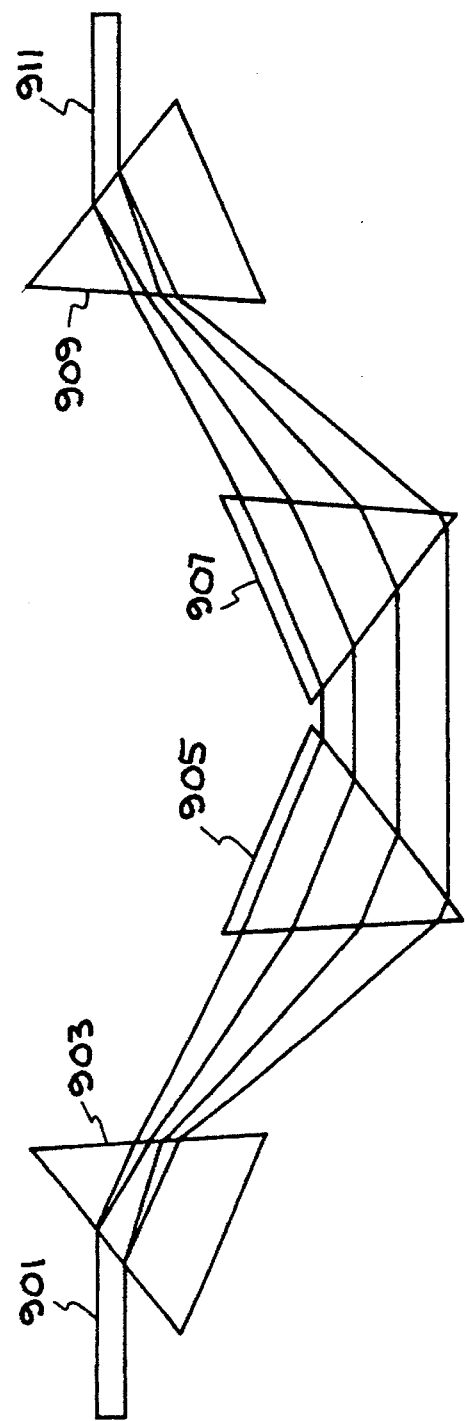
FIG. 9 illustrates the configuration of a conventional temporal pulse compressor.

FIG. 9 illustrates the configuration of a conventional temporal pulse compressor. An input beam 901 is incident on a first Brewster prism 903 and is passed through Brewster prisms 905, 907 and 909. The output beam 911 is temporally compressed because the blue rays, which are bent more by the first prism, then necessarily pass through less glass in the second and third prisms. As a result, the blue frequencies catch up with the red frequencies.

A comparison of FIGS. 8 and 9 illustrates a similarity between the achromatic phase-matching device of the instant invention and a standard temporal pulse compressor. In a manner similar to the temporal pulse compressor, the achromatic phase-matching device of FIG. 8 automatically temporally compresses the pulse. Even if unamplified pulses are to be used, the ability to adjust the pulse length, both at the input and at the output, is often desired. This is provided by the achromatic phase-matching device of FIG. 8.

It is important to note that conventional prism temporal pulse compressors as illustrated in FIG. 9 use Brewster prisms, in which the beam enters and exits at Brewster's angle. In contrast, the achromatic-phase matching device of FIG. 8, employing a spatial beam compressor, uses Littrow prisms. In a Littrow prism the beam exits at Brewster's angle (or larger angle if an anti-reflection coating can be made for the desired angle) but enters at normal incidence (ø zero degrees). The zero-loss condition is achieved in this device using anti-reflection coatings on the normal-incidence surface. Additionally, after the SHG crystal, a spatial beam expander using Littrow prisms would be employed in which the beam enters at Brewster's angle (or greater if a larger expansion is desired or AR-coating is available) but exits normal to the surface.

Figure 10B:
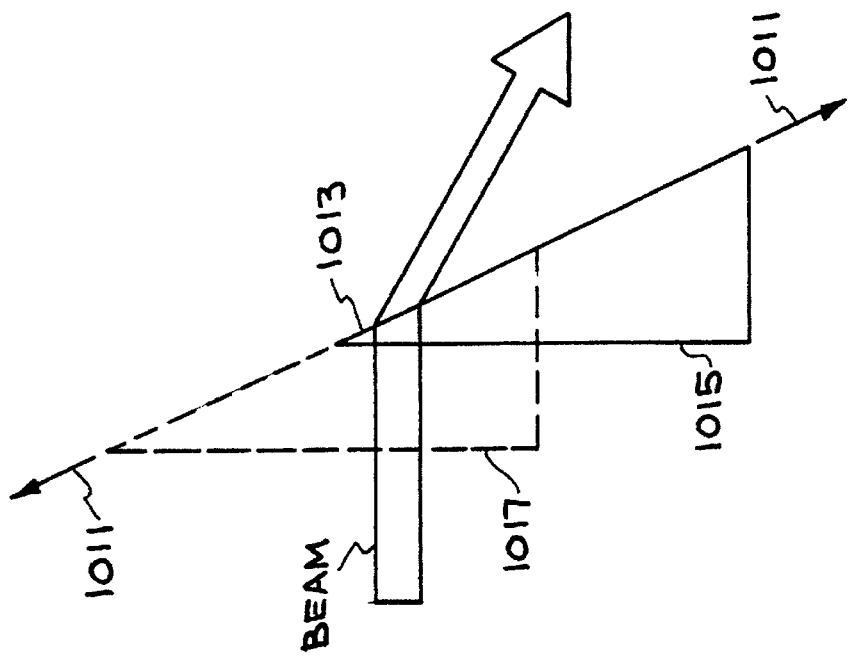
FIG. 10B illustrates an operation for tuning a Littrow prism in accordance with the instant invention.
Figure 10A:
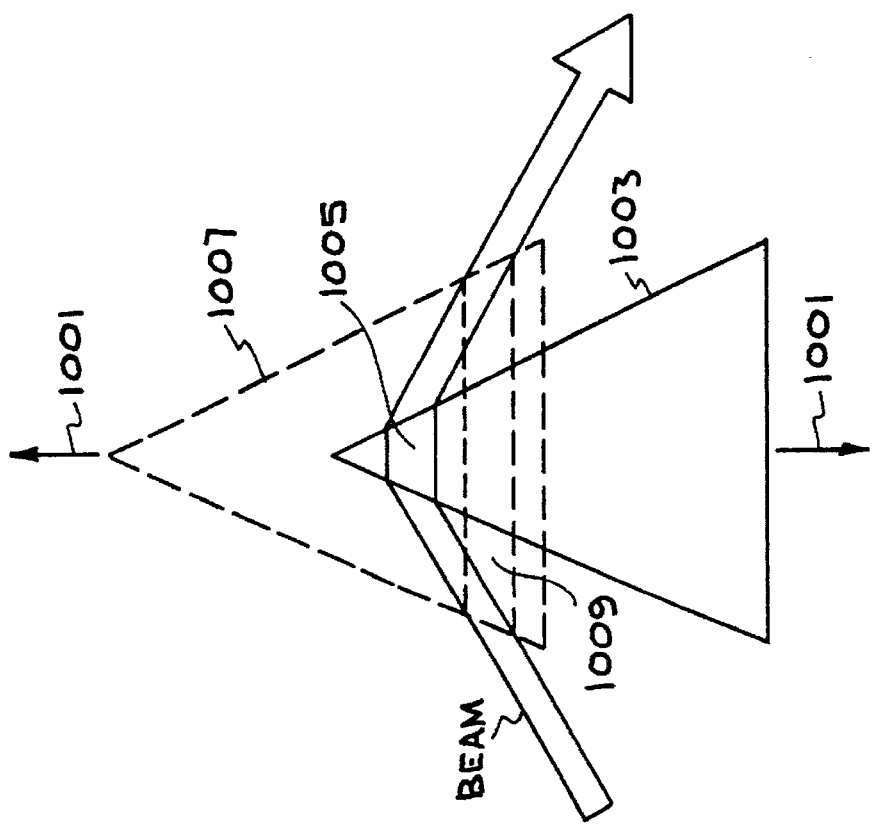
FIG. 10A illustrates a conventional method for tuning a Brewster angle prism in a pulse compression system.

While pulse compression can be readily achieved using the Littrow prism design of FIG. 8, since only prism dispersion is required for temporal compression, it is also important that the system be tunable. In conventional temporal pulse compressors using Brewster prisms as illustrated in FIG. 9, tuning is accomplished by translating the Brewster prism along the axis 1001 that bisects the apex angle as illustrated in FIG. 10A. As can be seen in FIG. 10A, translation along this axis varies the amount of glass in the beam. When in the first position relative to the beam illustrated by prism 1003, the beam passes through a relatively small amount 1005 of the prism 1003. Conversely, when the prism is translated to the position illustrated by prism 1007, the beam passes through a larger portion 1009 of the prism. In this manner, the group velocity dispersion, but not the beam position or direction, can be altered.

In order to tune the achromatic phase-matching device of FIG. 8, which uses Littrow prisms, the beam must be tuned without changing the beam position or direction. The translation of the prism is carried out along the axis 1011 aligned along the Brewster-angle-incidence face 1013 (or the high incidence-angle face if a different angle is used) as illustrated in FIG. 10B. As illustrated in FIG. 10B, the amount of prism 1015, 1017 is decreased or increased according to the translation. Thus, the spatial beam compressor employed in the achromatic phase matching device acts like a temporal pulse compressors, except that it also yields spatial compression (or expansion). It is noted that Littrow prisms have only one-half the dispersion of a Brewster prism, so the Littrow design has less dynamic range than the Brewster design. This can be compensated for by increasing the distance between the first and second prism in FIG. 8 or using a greater exit angle.

Note also that the above design implies that all light involved be p-polarized at each prism if a Brewster's angle effect is used. It must be noted that the SHG crystal will require s- or p-polarization depending on its characteristics. That is, the required input polarization will depend on whether the direction of the required dispersion is parallel to or perpendicular to the crystal c-axis, i.e., whether the crystal is positively or negatively birefringent. If s-polarization is required, then a polarization-rotating component, such as a half-wave plate, should be inserted just before the crystal. In this case, the second harmonic that will be produced, will be p-polarized and no polarization rotation will be required after the crystal. On the other hand, if p-polarization is required at the input, then no polarization rotation will be required before the crystal, but in this case, the crystal will produce s-polarized second-harmonic light. Then polarization rotation will be required after the crystal. In either case, a polarization-rotating device, such as a half-wave plate, is required, either just before or just after the SHG crystal. It will require a bandwidth at least as large as that of the light involved, which is easily obtained using a zero-order half-wave plate.

The instant invention is not limited to the above embodiment. Rather, various arrangements can be constructed using the features of the instant invention which simultaneously satisfy all of the above described constraints necessary for efficient operation. For example, prism 803 (FIG. 8) can be replaced with a Brewster prism in order to obtain additional dispersion.

Figure 11:
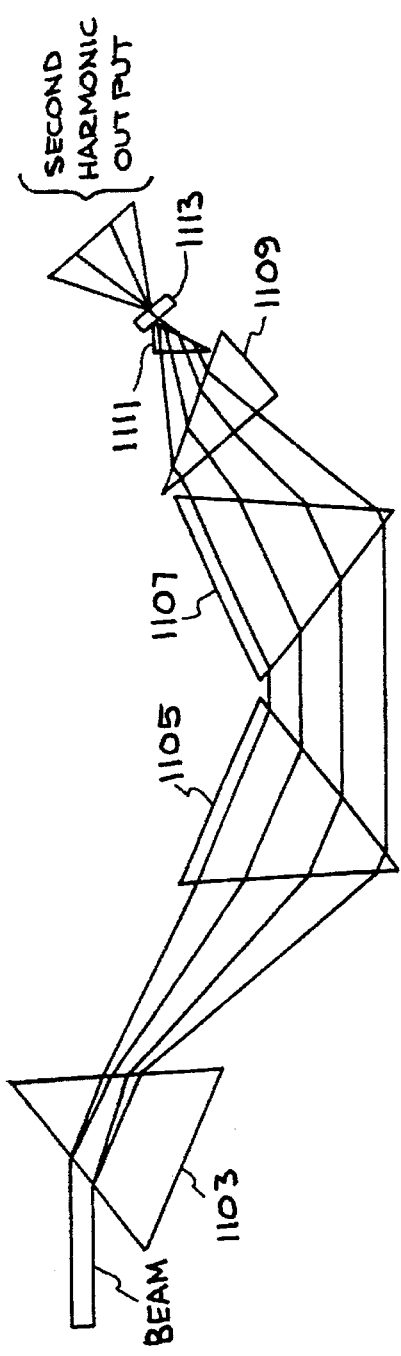
FIG. 11 illustrates another embodiment of an achromatic phase-matching system in accordance with the instant invention.

FIG. 11 illustrates another embodiment of the instant invention. In FIG. 11, three Brewster prisms 1103, 1105 and 1107 are disposed in a manner similar to a standard pulse compressor. Two (or more) Littrow beam—compressing prisms 1109 and 1111, receive the output from Brewster prism 1107 and direct the beam onto the SHG crystal 1113. This five prism design provides greater control over all parameters and achieves the optimal efficiency desired. In still another embodiment, the Littrow prisms 1109 and 1111 can be replaced with a two-lens telescope (not shown). Such a design has the same overall characteristics of the 5 prism design illustrated in FIG. 11, but provides less control over dispersion. The use of lenses may provide more convenient angles in the apparatus, but more strict alignment is required because dt/dx is not zero unless the lenses have the correct separation.

The actual design of an achromatic phase matching device will depend on the particular requirements. In each design, angles greater than Brewster's angle can be used for the prism exit (or entrance) angle to obtain greater spatial compression (or expansion), and hence greater magnification of the dispersion, with only a few per cent loss or no loss at all if coated.

The characteristics of the devices of FIGS. 8 and 11 as well as the three prism/two lens modification to FIG. 11 are depicted in the table of FIG. 6. As this table illustrates, in each of these devices the incidence angle at the crystal is independent of the input position (i.e., $d\theta/dx=0$) and can have a group velocity dispersion ($dt/dv$) which is tunable to zero or negative values.

According to the instant invention, each of the above embodiments can be used to frequency-double broadband incoherent light. As discussed above, incoherent light is similar to ultrashort-pulse light in the sense that it is also broadband. The difference is that, in incoherent light, the frequency modes are not in phase. The use of a grating has been suggested for frequency-doubling such broadband light. The devices described above also achieve greater efficiency for such light. Indeed, the mathematics for the SHG process of the various modes in this case is similar to that in the collinear case. In the incoherent case, however, it is not necessary to pulse compress in time, as the incoherent pulse is inherently long. Thus, the temporal compression aspect of the apparatus is unnecessary for such a light source. It would not, however, effect the operation of the device when used for incoherent light. Thus, a single device can be constructed in accordance with the principles described herein which could be used for both incoherent and coherent (i.e., ultrashort pulse) light.

Figure 12:
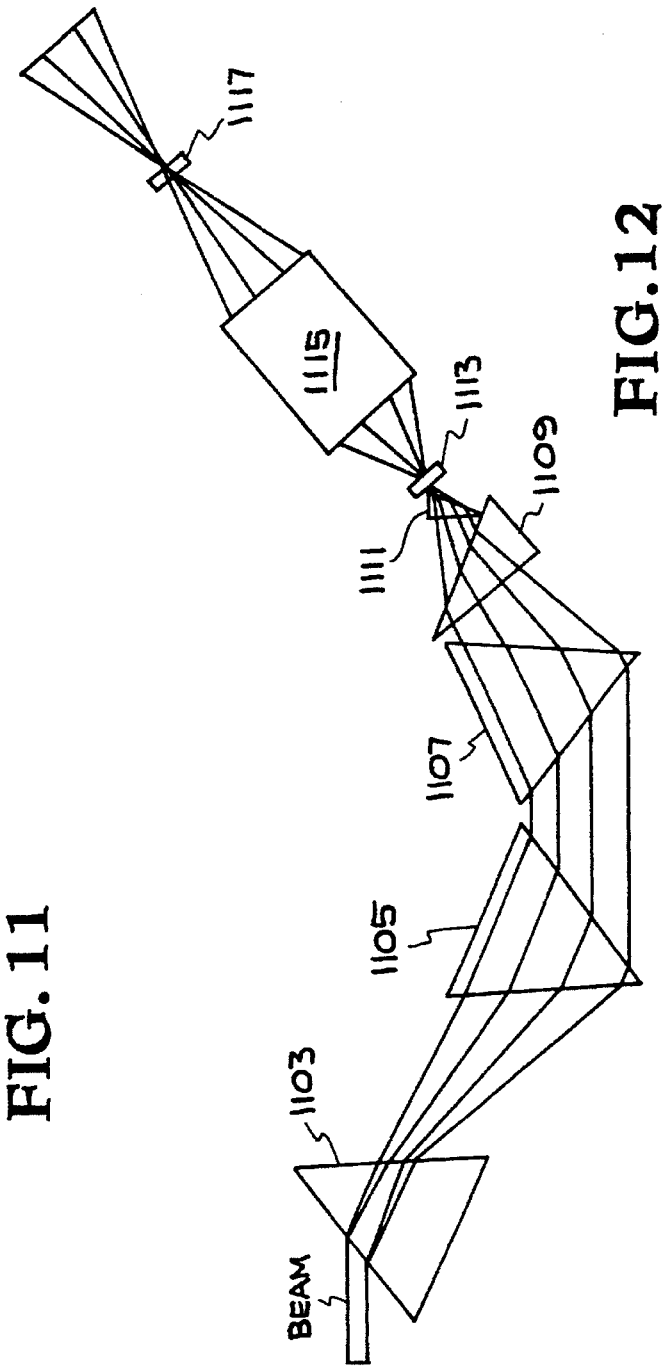
FIG. 12 illustrates the use of the achromatic phase-matching system in accordance with the instant invention to further carry out sum-generation.

FIG. 12 illustrates an apparatus according to the instant invention in which sum generation (i.e., third harmonic generation) of broadband light can also be carried out in a convenient and nearly optimally efficient manner. In sum generation, the second-harmonic light is combined with the remaining fundamental light to produce light at the third harmonic. For broadband light, sum generation has the same bandwidth problems as does SHG. As a result, an achromatic phase matching arrangement proves effective for improving its efficiency also. As illustrated in FIG. 12, a two-lens telescope 1115 is placed after the SHG crystal 1113. The five prism design of FIG. 11 is illustrated and operates the same as described above. A sum-generation crystal 1117 is provided after the telescope 1115. The telescope 1115 can be used to increase or decrease the beam dispersion of both the fundamental and second harmonic, depending on whether the required dispersion at the sum-generation crystal is greater than or less than that required for SHG. Since, at the SHG crystal 1113, each frequency, $v$, spatially and angularly overlaps the beam created at $2v$ (output from the SHG crystal 1113), a telescope will image these rays onto the sum-generation crystal with these frequencies still overlapped in both space and angle. Thus, the achromatic phase matching device of the instant invention provides for a sum-generation process which also has a very high efficiency. After the sum-generation crystal, the usual pulse reconstruction apparatus reconstructs the sum-generated third-harmonic pulse. Indeed, if the second-harmonic or fundamental pulse is also desired, it can be split off and reconstructed also using a different apparatus. A drawback of this device is that the group velocity dispersion of the two-lens telescope is slightly positive. Using thin lenses, however, can minimize the magnitude of this effect.

The above-described embodiments are provided as illustrative of the instant invention and are not considered exhaustive. Many modifications will be suggested to the skilled artisan upon review of the above disclosure. Accordingly, the invention is only limited by the fair scope of the appended claims.

What is claimed is:

1. An optical system for directing a large bandwidth light pulse having a plurality of light rays onto a nonlinear optical medium, the optical system comprising:

an input optical element arranged to receive the light pulse at a position x on the input optical element;

an output optical element arranged to direct an output light pulse onto the nonlinear optical medium at an angle Θ with respect to an optical axis of the nonlinear optical medium; and one or more intermediate optical elements arranged between the input optical element and the output optical element to direct light output from the input optical element onto the output optical element, wherein the angle Θ is substantially independent of the position x such that dΘ/dx is approximately zero, and at least one of the input, output and intermediate optical elements are adjustable such that the group-velocity dispersion dt/dv of the light pulse as it passes through the optical system is tuned to a desired value, where ν represents a frequency of a light ray in the light pulse and t represents a propagation time of the light ray passing through the optical system, and such that each light ray enters the nonlinear optical medium at an incidence angle which is equal to a phase matching angle of the nonlinear optical medium for the frequency of that light ray.

2. An optical system as recited in claim 1, wherein each of the input, output and intermediate optical elements are comprised of prisms and dθ/dx of the optical system equals zero.

3. An optical system as recited in claim 2, wherein at least one of the input, output and intermediate optical elements are comprised of a Littrow prism.

4. An optical system as recited in claim 2, wherein the input and output optical elements are comprised of Littrow prisms and the intermediate optical element is comprised of a single Littrow prism.

5. An optical system as recited in claim 1, wherein:

the input optical element is comprised of a Brewster prism; and the intermediate optical elements are comprised of at least two Brewster prisms.

6. An optical system as recited in claim 5, wherein the output optical element comprises a plurality of Littrow beam-compressing prisms.

7. An optical system as recited in claim 5, wherein the output optical element comprises a two-lens telescope.

8. An optical system as recited in claim 1, wherein the group-velocity dispersion dt/dv can be tuned to a value less than zero.

9. An optical system as recited in claim 1, wherein the adjustable one of the input, output and intermediate optical elements is an adjustable prism.

10. An optical system as recited in claim 9, wherein the adjustable prism is a Littrow prism, the group-velocity dispersion being adjustable dt/dv to the desired value by translating the Littrow prism along an axis defined by a high incident angle face of the Littrow prism to vary a path length of the light pulse through the prism.

11. An optical system as recited in claim 1, wherein a duration of the large bandwidth light pulse is between $10^{-15}$ to $10^{-12}$ seconds.

12. An optical system as recited in claim 1, wherein the large bandwidth light pulse is generated from a source of coherent light.

13. An optical system as recited in claim 1, wherein the large bandwidth light pulse is generated from a source of incoherent light.

14. A method of directing a large bandwidth light pulse having a plurality of light rays onto a nonlinear optical medium, the method comprising the steps of:

directing the light pulse to a series of optical elements such that the light pulse is incident on an input optical element at a position x on the input optical element;

passing the light pulse through the series of optical elements;

directing the light pulse from the series of optical elements onto the nonlinear optical medium at an angle Θ with respect to an optical axis of the nonlinear optical medium such that the angle Θ is substantially independent of the position x such that dΘ/dx is approximately zero; and adjusting group velocity dispersion of the light pulse as it travels through the series of optical elements such that the group-velocity dispersion of the light pulse is at a desired value when it reaches the nonlinear optical medium, and such that each light ray enters the nonlinear optical medium at an incidence angle which is equal to a phase matching angle of the nonlinear optical medium for the frequency of that light ray.

15. A method as recited in claim 14, wherein the group-velocity dispersion is adjusted in the adjusting step such that the pulse has a maximum intensity at the nonlinear medium.

16. An apparatus for directing a large bandwidth light pulse having a plurality of light rays onto a nonlinear optical medium, comprising:

an input optical element configured to receive the light pulse at a position x thereon; and an output optical element configured to output the light pulse onto the nonlinear optical medium at an angle Θ relative to the nonlinear optical medium which is substantially independent of the position x, and to direct each light ray to enter the nonlinear optical medium at an incidence angle which is equal to a phase matching angle of the nonlinear optical medium for the frequency of that light ray, wherein an intensity of the light pulse incident upon the nonlinear medium is maximized by adjusting a group velocity dispersion of the light pulse as it passes through the apparatus.

17. A method of converting an input light pulse having a first and a second frequency into an output light pulse having a third and a fourth frequency corresponding respectively to the first and second frequency, the third and the fourth frequency being an integer n multiple of the first and the second frequency, respectively, the method comprising the steps of:

directing the input light pulse to a first series of optical elements such that the input light pulse is incident on an input optical element of the first series of optical elements at a position x on the input optical element;

passing the input light pulse through the first series of optical elements such that a group velocity dispersion of the input light pulse as it exits the first series of optical elements has a desired value;

directing the input light pulse from the first series of optical elements onto a first nonlinear optical medium at an angle Θ with respect to an optical axis of the first nonlinear optical medium such that the angle Θ is substantially independent of the position x;

passing the input light pulse through the first nonlinear optical medium to produce an intermediate light pulse including light of the first and the second frequency and light of a first and a second intermediate frequency, the first and the second intermediate frequency being an integer m multiple of the first and the second frequency, respectively;

passing the intermediate light pulse through a second series of optical elements to direct the intermediate light pulse onto a second nonlinear optical medium; and passing the intermediate light pulse through the second nonlinear optical medium to produce the output light pulse having the third and the fourth frequency.

18. A method as recited in claim 17, wherein the integer m equals 2.

19. A method as recited in claim 17, wherein the integer n equals 3.

20. A method as recited in claim 17, wherein the step of passing the input light pulse through the first nonlinear optical medium comprises a step of passing the input light pulse through a second harmonic generation crystal, and the step of passing the intermediate light pulse through the second nonlinear optical medium comprises a step of passing the intermediate light pulse through a sum generation crystal.

* * * * *